United States Patent [19]
Yoshida

[11] Patent Number: 4,672,461
[45] Date of Patent: Jun. 9, 1987

[54] IMAGE PROCESSING APPARATUS
[75] Inventor: Eiichi Yoshida, Kawasaki, Japan
[73] Assignee: Canon Kabushiki Kaisha, Tokyo, Japan
[21] Appl. No.: 677,095
[22] Filed: Nov. 30, 1984
[30] Foreign Application Priority Data
  Dec. 9, 1983 [JP] Japan .................... 58-231359
[51] Int. Cl.$^4$ ............................................. H04N 1/40
[52] U.S. Cl. .................................... 358/280; 358/282; 358/293; 382/53
[58] Field of Search ............... 358/282, 280, 293, 294; 382/52, 53, 54

[56] References Cited
U.S. PATENT DOCUMENTS

| | | | |
|---|---|---|---|
| 3,790,706 | 2/1974 | Gubala et al. ................. | 358/280 X |
| 4,468,703 | 8/1984 | Fujiwara et al. ................ | 358/282 |
| 4,468,704 | 8/1984 | Stoffel et al. .................... | 358/282 |
| 4,562,486 | 12/1985 | Suzuki et al. ................... | 358/282 |

Primary Examiner—Edward L. Coles, Sr.
Attorney, Agent, or Firm—Fitzpatrick, Cella, Harper & Scinto

[57] ABSTRACT

An image processing apparatus comprising a detector for reading out image information on an original placed on an original glass plate and detecting an area of the original, and a microcomputer for detecting a concentration level regarding the main-scan line of the image information in the original area read out by the detector and operating a threshold value for a binary coding process regarding the main-scan line of the image information on the basis of the concentration level. By changing the threshold level, the background noise eliminating process can be performed even if the background level varies. Thus, even if an original is unevenly placed on the original glass plate, the background noise eliminating process can be executed in the whole area of the original image.

10 Claims, 13 Drawing Figures

IMAGE PROCESSING APPARATUS

BACKGROUND OF THE INVENTION

1. Field of the Invention

The present invention relates to an image processing apparatus which can perform a process of an image on an original.

2. Description of the Prior Art

Conventionally, in the case of performing a process to remove the background noise of an original image, there has been adopted a method of performing the process to eliminate the background noise in an arbitrary area on a predetermined original readout surface on the basis of the size of the original which is selected by the operator. However, this method has the drawback that with respect to a small original or an original which was preliminarily irregularly placed on the original readout surface without being designated, it is impossible to perform the process to eliminate the background noise in the whole area of the original image.

In this invention, the process to eliminate the background noise denotes a series of processes such that, upon recording of an image, the portion other than the image information such as characters, figures or the like on an original, namely, the background portion on the original, is not recorded at the gradient level which was actually detected in that background portion but is recorded at a predetermined level such as white or the like.

SUMMARY OF THE INVENTION

It is an object of the present invention to eliminate the above-mentioned drawback.

Another object of the invention is to improve an image processing apparatus.

Another object of the invention is to provide an image processing apparatus which can perform the process to eliminate the background noises in the whole original image even with respect to an original which was placed irregularly on an original mounting plate by detecting a range of original.

Another object of the invention is to provide an image processing apparatus which can perform the background noise eliminating process even when a background level varies by changing a threshold level.

Other objects and features of the present invention will be apparent from the following detailed description in conjunction with the accompanying drawings.

DETAILED DESCRIPTION OF THE PREFERRED EMBODIMENTS

The present invention will now be described in detail hereinbelow with reference to the drawings.

Figure 1:
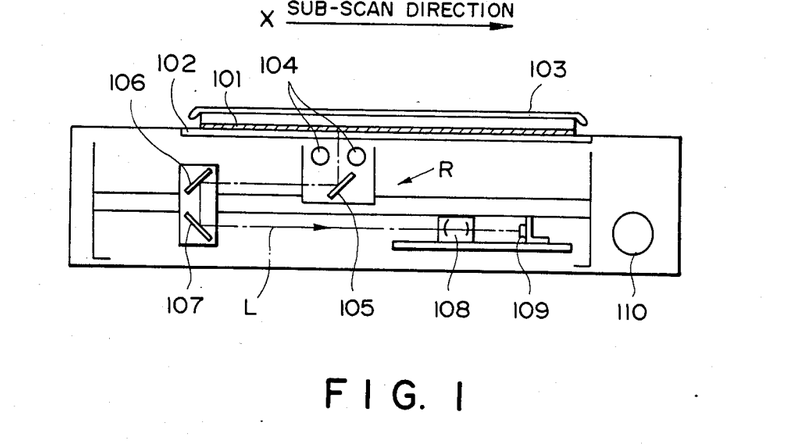
FIG. 1 is a schematic diagram showing an example of an arrangement of an image processing apparatus according to the present invention.

FIG. 1 shows an example of an arrangement of an image processing apparatus according to the present invention. In the diagram, an original 101 may be placed upside down on an original glass 102 and pressed on the original glass 102 by an original cover 103. The original 101 is illuminated by a light source 104 and the reflected light from the original 101 forms an optical path L so as to be formed as an image on a photo sensitive surface of an image pickup device 109 such as, for example, a CCD image sensor through mirrors 105, 106 and 107 and a lens 108.

The light source 104 and mirror 105 and the mirrors 106 and 107 constitute an optical unit R which moves at a relative velocity of 2:1. This optical unit R moves from the left to the right at a constant velocity while performing the PLL control by a DC servo motor 110. The moving velocity of the optical unit R is variable from 90 to 360 mm/sec in the forward path in accordance with copy magnification, while it is always a constant velocity of 630 mm/sec in the backward path. The optical unit R is forwardly moved from the left end to the right end by the DC servo motor 110 while reading out an image in the moving direction of the optical unit R, namely, in a main-scan direction X perpendicular to a sub-scan direction Y by the image pickup device 109 with a resolution power of 16 pel/mm. Thereafter, the optical unit R is again moved backward to the left end by the DC servo motor 110, thereby finishing the single readout scan.

Next, a method of detecting the position of the original 101 will be explained with reference to FIG. 2.

Figure 2:
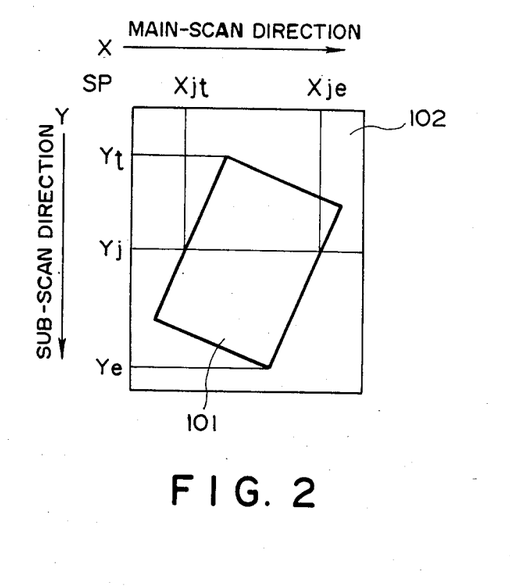
FIG. 2 is an explanatory diagram showing the positional relation between an original plate and an original shown in FIG. 1.

FIG. 2 shows the state in that the original 101 is placed on the original glass 102. Although the original 101 is generally placed in a manner such that the corner of the original 101 is aligned with reference coordinates SP on the original glass 102, it may be obliquely placed as shown in the diagram. In this case, an original range from $X_{jt}$ to $X_{je}$ on the $Y_j$-th main-scan line (where it is assumed that the main-scan direction is X and the sub-scan direction is Y) from the reference coordinates SP is detected by, for instance, pre-scanning the optical unit R during the preliminary operation of the apparatus. This makes it possible to detect the image range of the original 101 and to determine the size and position of the original from the detection result. It is also possible to determine the scan stroke of the recording apparatus and to select a desired paper size. The original cover 103 (refer to FIG. 1) is mirror processed so that the image data which is obtained out of the area where the original 101 is placed becomes black data. Therefore, the range of the original can be detected on the basis of the difference of the image data obtained due to the reflection. In the pre-scan by the optical unit R prior to recording an image, the main-scan and sub-scan are performed with respect to the whole surafce area of the original glass 102 to detect the range of original, thereafter the scan for recording the image which will be explained later is executed subsequently. The pre-scan velocity is set to be faster than the scan velocity when the image is recorded.

Figure 3:
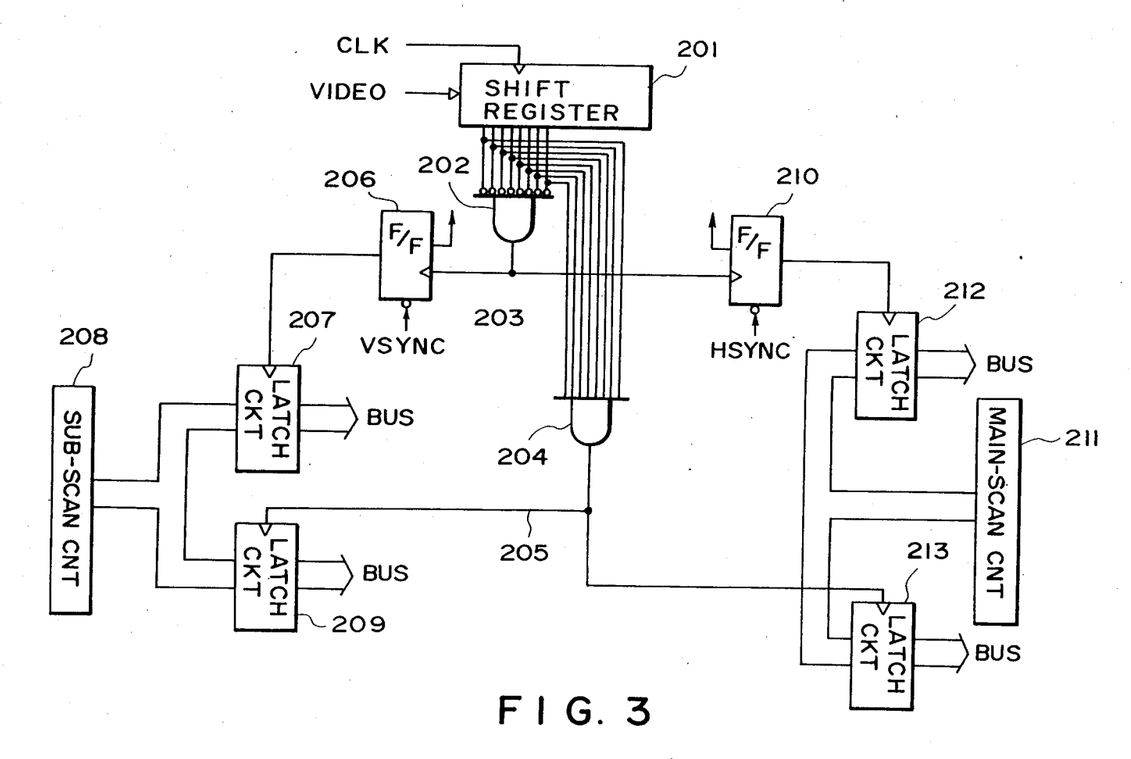
FIG. 3 is a block diagram showing an example of an arrangement of an original position detecting circuit in the apparatus of the invention.

Next, FIG. 3 shows an example of an arrangement of an original position detecting circuit to detect the foregoing original range.

An image signal VIDEO which was read out by the image pickup device 109 during to the pre-scan by the optical unit R and was binary coded is inputted to a shift register 201 which can input it as, for instance, eight-bit data. The shift register 201 is made operative in response to a clock pulse CLK. Upon completion on of the input of the data of eight bits, the shift register 201 sends the 8-bit data to gate circuits 202 and 204. The gate circuit 202 checks the 8-bit data to see if all of them are "0" (white image) or not. When all of the 8-bit data indicate white image, the gate circuit 202 outputs "1" onto a signal line 203. Likewise, the gate circuit 204 detects whether all of the 8-bit data are "1" (black image) or not and outputs "1" onto a signal line 205 when all of the 8-bit data represent the black image.

A flip flop 206 is set in response to the output "1" of when gate circuit 202, namely, the data of eight bits indicative of white image first appears after the scan of the original is started. This flip flop 206 has been preliminarily reset in response to an image head signal VSYNC.

When the flip flop 206 is once set in response to the output "1" from the gate circuit 202, the set state is maintained until the next image head signal VSYNC is inputted. The output signal is supplied to a latch circuit 207 when the flip flop 206 is set, so that a value of a sub-scan counter 208 for counting the sub-scan lines by the optical unit R is transferred to the latch circuit 207. The numerical value stored in the latch circuit 207 becomes a coordinate value $Y_t$ in FIG. 2. This coordinate value $Y_t$ is held until the next image head signal VSYNC is inputted.

Since the output of the gate circuit 204 becomes "1" whenever the above-mentioned eight bits change from the state whereby at least one bit among them indicates white image to the state whereby all of the eight bits represent black image, the value of the sub-scan counter 208 at this time is transferred to a latch circuit 209. In other words, the value of the sub-scan counter 208 is latched whenever the output of the gate circuit 204 changes from "0" to "1". Therefore, in the sub-scan direction Y, all of the data having a unit of eight bits after a coordinate value $Y_e$ shown in FIG. 2 continuously indicate black image, that is, the output of the gate circuit 204 is held to be "1", so that this value $Y_e$ is maintained in the latch circuit 209.

When the 8-bit white image data first appears for every main-scan line, a flip flop 210 is set in response to the output "1" from the gate circuit 202. This flip flop 210 has been reset in response to a horizontal sync signal HSYNC which is given when the optical unit R scans. The flip flop 210 is set by the 8-bit white image data which first appears and this set state is maintained until the next horizontal sync signal HSYNC is generated. Since output signal is supplied to a latch circuit 212 when the flip flop 210 is set, a value of a main-scan counter 211 for counting the line in the main-scan direction is transferred to the latch circuit 212. The value stored in the latch circuit 212 becomes the coordinate value $X_{jt}$ in FIG. 2.

The output of the gate circuit 204 becomes "1" whenever the eight bits change from the state whereby at least one bit indicates the white image to the state whereby all of the eight bits represent the black image, so that a value of the main-scan counter 211 at this time is transferred to a latch circuit 213. Thus, in the main-scan direction X, all of the eight-bit data after the coordinate value $X_{je}$ in FIG. 2 continuously indicate black image; therefore, this value is held.

Each data which is stored in the latch circuits 207, 209, 212, and 213 is supplied through a bus BUS to a central processing unit (hereinafter referred to as a CPU)307 of, for instance, the microprocessor type shown in FIG. 4.

In this way, due to the single scan of the original, it is possible to read out the coordinate values $Y_t$ and $Y_e$ in the sub-scan direction Y and the coordinate values $X_{jt}$ and $X_{je}$ in each main-scan direction X from the start of scan position to the end of scan position in the sub-scan direction with respect to the main-scan direction X, respectively. Therefore, the range of original on the readout surface 102 of the original 101 can be detected. According to this method, the original range can be accurately detected irrespective of the arrangement of the original or the shape of image area, for example, rectangle, triangle, circle, or the like.

Figure 4:
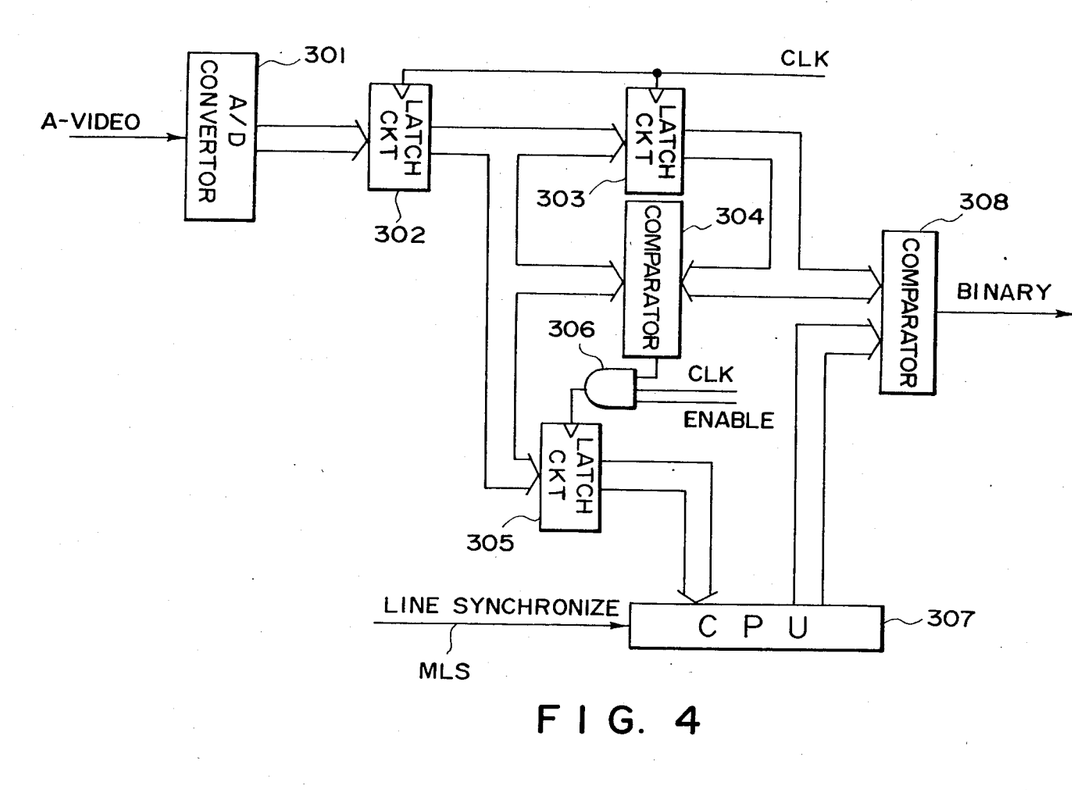
FIG. 4 is a block diagram showing an example of an arrangement of an image signal processing circuit in the apparatus of the invention.

Then, FIG. 4 shows an example of an arrangement of an image signal processing circuit for processing the image signal which is obtained from the image pickup device 109 shown in FIG. 1.

An A/D converter 301 A/D converts an image signal (analog signal) A-VIDEO which was read out by the image pickup device 109 to a six-bit digital signal. The digital signal converted by the A/D converter 301 is once stored in a latch circuit 302 which operates synchronously with the sampling clock CLK. The signal stored in the latch circuit 302 is respectively transferred to a latch circuit 303, a comparator 304 and a latch circuit 305 synchronously with the next clock CLK.

The comparator 304 compares the output levels of the 6-bit image signal transferred from the latch circuit 302 and of the 6-bit image signal sent from the latch circuit 303 which is one clock before. When the level of the new image signal transferred from the latch circuit 302 has a smaller value, a comparison output is sent to an AND gate 306. The AND gate 306 sends the comparison output from the comparator 304 to the latch circuit 305 synchronously with the sampling clock CLK. When the latch circuit 305 receives the comparison output, it sends the image signal transferred from the latch circuit 302 to the CPU 307. In addition to the output from the comparator 304 and the sampling clock CLK, an enable signal ENABLE indicative of the effective interval of the original image is inputted to the AND gate 306.

This signal ENABLE is made enable only in the original range obtained by the foregoing circuit shown in FIG. 3, that is, in the range from the coordinate values $Y_t$ to $Y_e$ which are stored in the latch circuit 207 and 209 in the sub-scan direction Y and in the range from the coordinate values $X_{jt}$ to $X_{je}$ which are stored in the latch circuit 212 and 213 in the main-scan direction X in the above-mentioned interval from the coordinate values $Y_t$ to $Y_e$. The result of comparison in level of the image signal of two clocks in this interval is sent from the latch circuit 305 to the CPU 307. In the CPU 307, the lowest concentration level of each main-scan line, i.e., the concentration of the background of the original (hereinafter referred to as the background level), can be detected by receiving the image signal from the latch circuit 305 synchronously with a main-scan line sync signal MLS.

Next, the CPU 307 determines the binary coded threshold value for every main-scan line due to the algorithm mentioned later on the basis of the background level which was detected as described above and sends this threshold value to a comparator 308 synchronously with the main-scan line sync signal MLS. The comparator 308 compares the image signal from the latch circuit 303 with the threshold value from the CPU 307 and produces a binary coded signal. Since the level of each pixel after the A/D conversion by the A/D converter 301 is constituted by six bits, the most black portion is expressed by $3F_{(HEX)}$ (hereinafter, referred to as $3F_H$) and the most white portion is expressed by 0. The threshold value and background level for every main-scan line are also expressed by 0 to $3F_H$.

Figure 5:
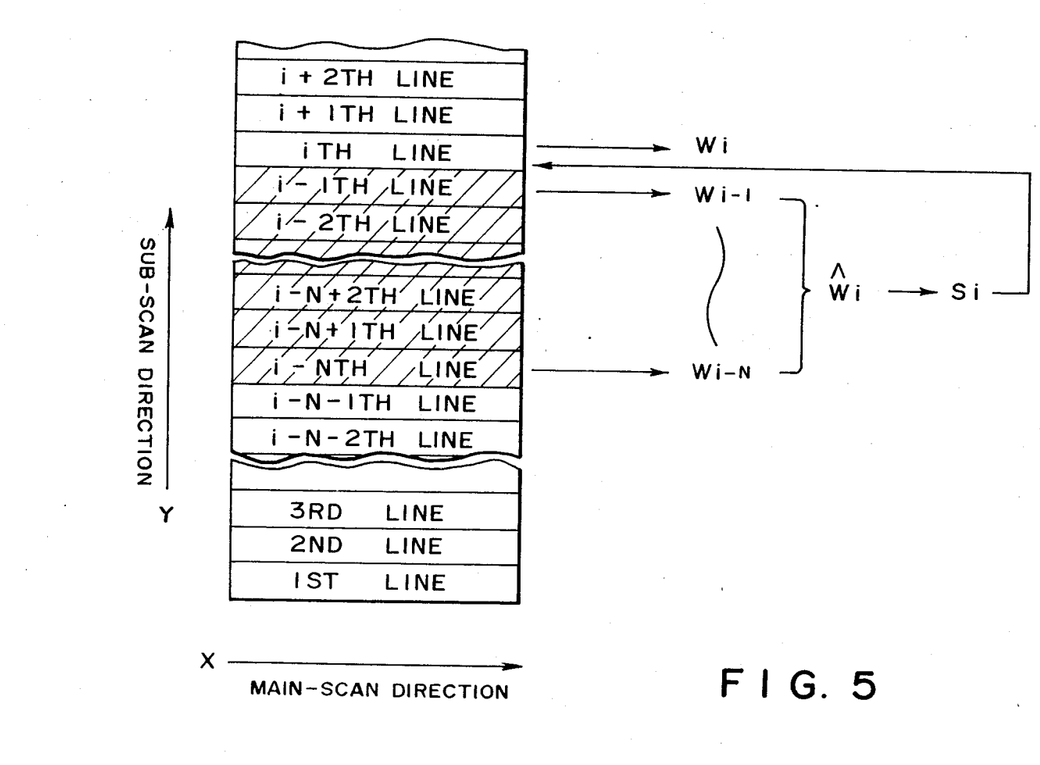
FIG. 5 is an explanatory diagram showing the procedure to determine a threshold value regarding the i-th main-scan line.

Referring now to FIG. 5, there will then be explained the algorithm to predict the background level and determine the threshold value regarding the main-scan line which should be scanned from the background level of each of the N lines immediately before the main-scan line that is to be scanned at present. In the drawing, $W_{i-1}$ denotes a background level detected with regard to the (i−1)th main-scan line; $\hat{W}$ is a prediction value of the background level of the i-th main-scan line which is predicted due to an algorithm mentioned later on the basis of the N data from a background level $W_{i-N}$ of the (i−N)th main-scan line to a background level $W_{i-1}$ of the (i−1)th main-scan line; and $S_i$ is a threshold value regarding the i-th main-scan line which is determined from the prediction value $\hat{W}$ due to an algorithm mentioned later.

Practically speaking, after completion of the scan of the (i−1)th line, the prediction value $\hat{W}_i$ of the background level of the i-th line is derived from the N background levels $W_{i-k}$ (where, k=1, ..., N) which were detected with regard to the N lines from the (i−N)th line to the (i−1)th line before the scan of the i-th line is started. Then, the threshold value $S_i$ regarding the i-th line is obtained from the prediction value $\hat{W}_i$. When the scan of the i-th line is started, the binary coding process is performed on the basis of the threshold value $S_i$, and at the same time the actual background level of the i-th line is also derived.

Figures 6, 6A:
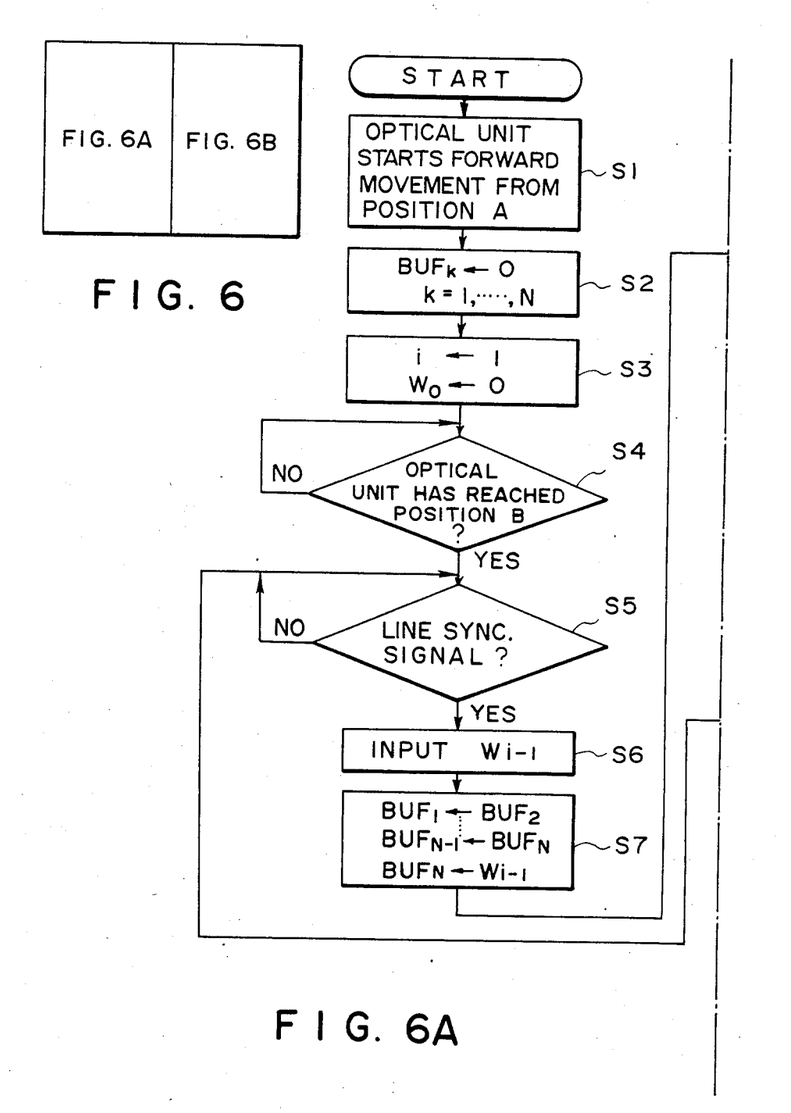
FIG. 6 is a flow chart showing an example of the operation of the apparatus of the invention.
Figure 6B:
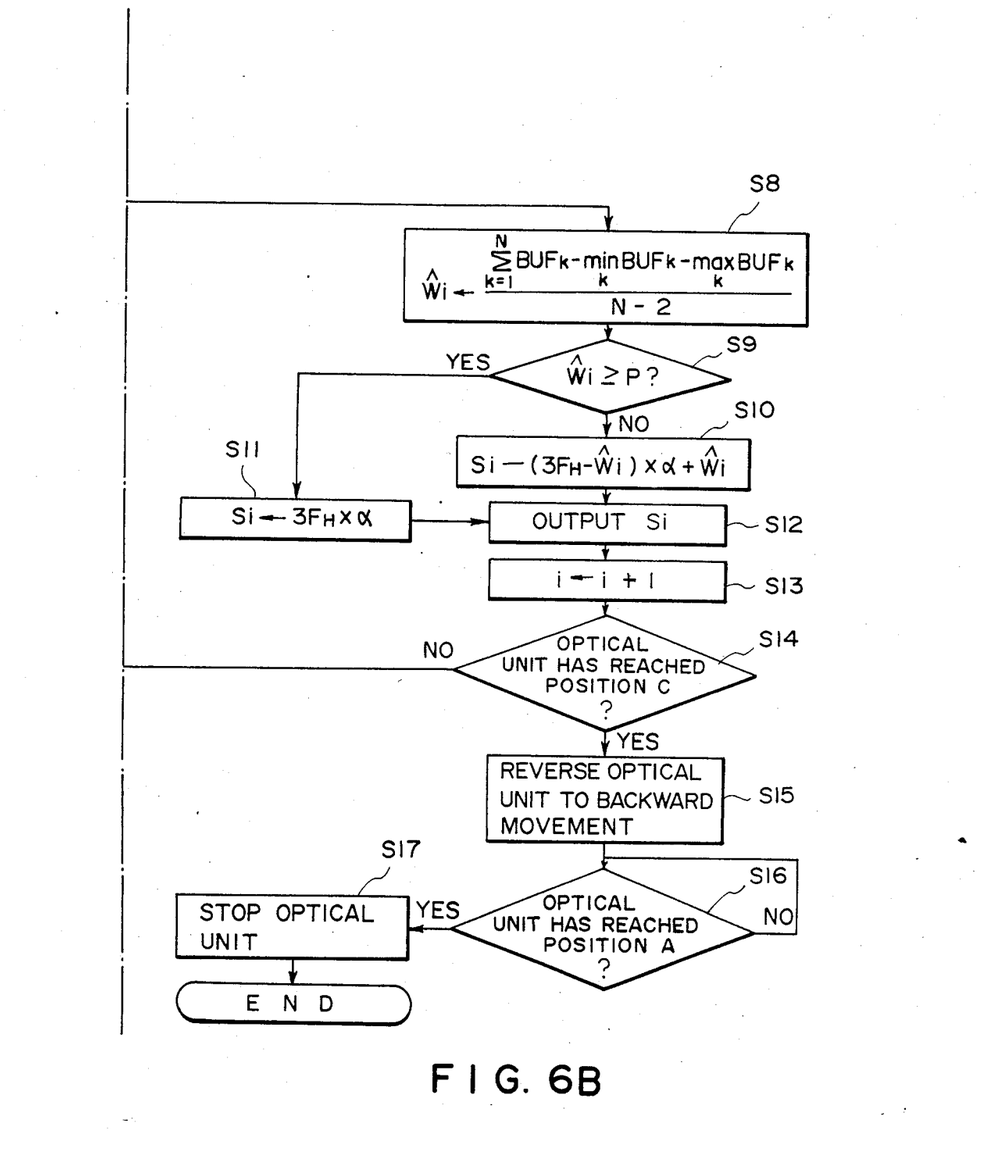

Next, an example of the control operation of the CPU 307 will be explained with reference to FIG. 6.

Figure 7:
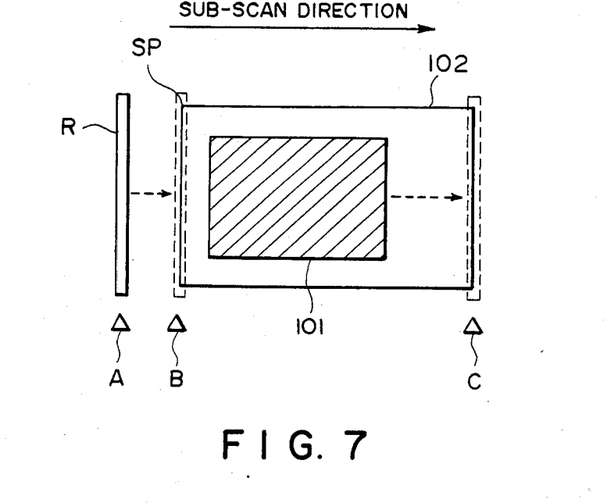
FIG. 7, consisting of FIGS. 7A and 7B, is an explanatory diagram showing the positional relation between the original plate and an optical unit shown in FIG. 1.

First, as shown in FIG. 7, the optical unit R starts the forward movement from its home position point A (step S1), then initialization of each circuit is executed (steps S2 and S3) until the optical unit R reaches a head point B of the image (step S4). In step S2, an initialization is made with respect to memory areas $BUF_1$ to $BUF_N$ (not shown) in an N-byte random access memory in which the N background levels of the N lines immediately before the line that should be scanned at present are always stored. In step S3, $W_0$ is set to 0 in order to obtain a prediction value $\hat{w}_1$ of the background level of the first main-scan line.

Subsequently, it is determined by means of a sensor (not shown) that the optical unit R has reached point B (step S4). Thereafter, whenever the main-scan line sync signal is generated, the background level of the previous line is fetched (steps S5 and S6); the oldest background level data stored in the memory area $BUF_1$ is erased; the content of the memory area $BUF_j$ is transferred to the memory area $BUF_{j-1}$; and the fetched latest data is stored in the memory area $BUF_N$. Thus, the newest N background level data are always stored in the memory areas $BUF_1$–$BUF_N$ (step S7).

Next, as shown in step S8, in order to eliminate the peculiar data from the N background level data, the maximum and minimum values in the N data are eliminated and the mean value of the remaining N−2 data is adopted as the prediction value $\hat{W}_i$ of the background level of the line that should be scanned. Namely, the prediction value $\hat{W}_i$ becomes $$\hat{W}_i = \left[ \sum_{j=1}^{N} W_{i-j} - \max_j W_{i-j} - \min_j W_{i-j} \right] / (N-2)$$

Further, in the case where the prediction value $\hat{W}_i$ is smaller than a predetermined value P, the threshold value $S_i$ is determined by $$S_i = (3F_H - \hat{W}_i) \times \alpha + \hat{W}_i$$

so that the background level $\hat{W}_i$ which is predicted indicates the white image (steps S9 and S10). On the other hand, when the prediction value $\hat{W}_i$ is equal to or greater than the predetermined value P in step S9, step S11 follows and the threshold value $S_i$ is set to $$S_i = 3F_H \times \alpha$$

Figure 8A:
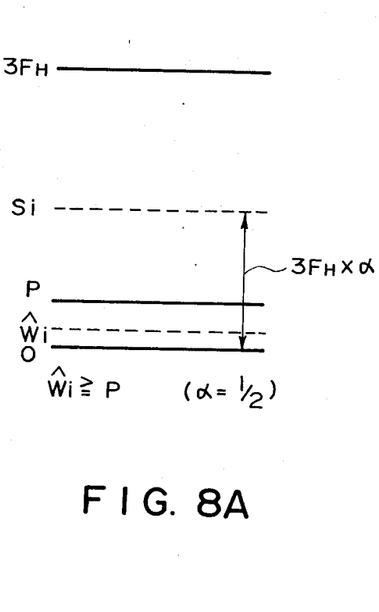
FIGS. 8A and 8B are diagrams showing situations in determination of the threshold value.
Figure 8B:
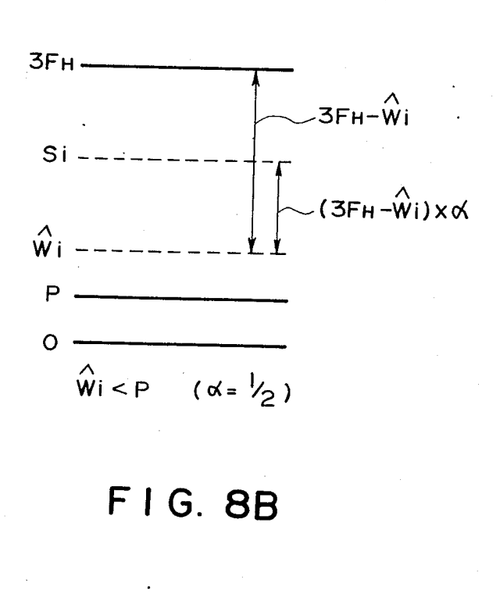

$\alpha$ is a coefficient to set an interior division point of a predetermined ratio between the black level $3F_H$ and the background level $\hat{W}_i$ to a threshold value and satisfies the relation of $0 < \alpha < 1$. This coefficient $\alpha$ is determined from experience and is set to, e.g., $\alpha = \frac{1}{2}$. FIGS. 8A and 8B show the situations in determination of the threshold values in the cases where $\hat{W}_i \geq P$ and where $\hat{W}i < P$ when $\alpha = \frac{1}{2}$. The coefficient $\alpha$ may be set to any value of, e.g., 1/10, 2/10, ..., 9/10, etc., in accordance with the proper set concentration which is set by the operator by use of a concentration lever (not shown).

The threshold values $S_i$ which was determined as mentioned above is outputted (step S12) and the processes in steps S5 to S14 are repeatedly performed until the optical unit R reaches a reversing position point C of the optical unit shown in FIG. 7. When it is detected by a sensor (not shown) that the optical unit R has reached begin point C, the optical unit R is reversed, to the backward movement (step S15). Further, when the optical unit R has reached the home position point A, the operation of the optical unit R is stopped (steps S16 and S17).

After the (N+1)th line, the actual detection data is always stored in the memory area $BUF_i$. However, with respect to the first to N-th lines, upon initialization in steps S2 and S3, the virtual N lines of which the detection value of the background level is 0 are assumed before the first line and the threshold value is calculated and the binary coding process is performed.

For example, assuming that N=16, the binary coding process is carried out on the basis of the virtual data with respect to the first 16 lines. However, the resolution power of 16 pel equivalently corresponds to 1 mm and the head portion of 1 mm in the actual original is generally the background portion without information; therefore, there will be no problem if it is assumed that the head portion has the background level of 0.

Figure 9:
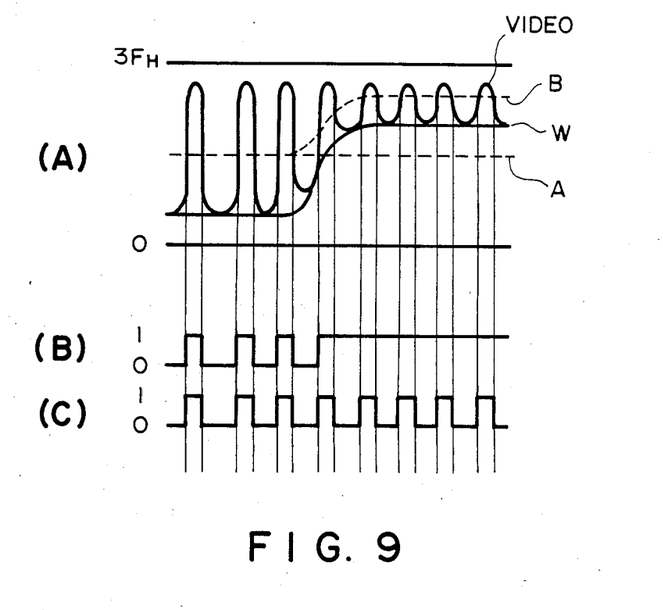
FIGS. 9(A) to 9(C) are waveform diagrams showing an example of comparison between a binary coded signal obtained using the preferred embodiment of the present invention and a binary coded signal derived due to a conventional example.

According to the above-mentioned method, with regard to an original such that the background level W largely varies as shown in FIG. 9(A), a threshold value A cannot adequately follow in correspondence to this change; therefore, it is binary coded as shown in FIG. 9(B) and the background portion and information portion could not be sufficiently separated. However, in this embodiment, a threshold value B follows the change of the background level as shown in FIG. 9(A), so that the background portion certainly becomes white and can be separated from the information portion as shown in FIG. 9(C). Consequently, in the embodiment, the pre-scan and memory for storage of the image signal are not needed in particular for determining or binary coding the threshold value, but the threshold value can be determined at a real-time. In FIG. 9(A), VIDEO denotes the image signal.

In the foregoing method, the threshold value can be obviously determined on the basis of the main-scan line of $N=1$, that is, immediately before the line that should be scanned.

Although the background level is detected in the embodiment, it is also possible to detect the concentration peak values of both white and black images, namely, the lowest concentration level and the highest concentration level and to determine the threshold value to perform the binary coding process by use of those levels.

As described above, according to the embodiment, the original range can be automatically detected and the background noise eliminating process can be performed with respect to only the image area. However, it is apparent that the area where the background noise eliminating process is performed can be manually decided by scanning on a scan panel (not shown).

As described above, a range of original is preliminarily detected and the background noise eliminating process is executed with respect to only this detected area of the original. Consequently, even with regard to an original placed at any position on the original plate, it is possible to perform the background noise eliminating process with respect to the whole original area.

The present invention is not limited to the above-described embodiment, but many modifications and variations are possible within the spirit and scope of the appended claims.

I claim:

1. An image processing apparatus comprising:
   an original placing plate for placing an original thereon;
   reading means for reading out an image of the original placed on said original placing plate and outputting an image signal;
   recognizing means for recognizing the shape of the original placed on said original placing plate in response to the image signal output by said reading means; and
   control means for controlling which portion of the image signal is to be used to determine a condition for image processing in response to the shape of the original recognized by said recognizing means.

2. An image processing apparatus according to claim 1, wherein said image process condition comprises a threshold for determining the density of reproduced image.

3. An image processing apparatus according to claim 1, wherein said control means sets a density level of a predetermined portion of the original to a predetermined level.

4. An image processing apparatus according to claim 1, wherein said reading means pre-scans the original and said recognizing means recognizes the shape of the original in response to the result of this pre-scan.

5. An image processing apparatus according to claim 1, wherein said recognizing means further recognizes the position on said original placing plate where the original is placed.

6. An image processing apparatus according to claim 1, wherein said control means determines the image process condition response to the image signal within an area where the original is placed.

7. An image processing apparatus comprising:
   an original placing plate for placing an original thereon;
   reading means for reading out an image of the original placed on said original placing plate and outputting an image signal;
   recognizing means for recognizing the shape of the original placed on said original placing plate in response to the image signal output by said reading means;
   detecting means for detecting a level of density of the image on a main-scan line within the shape in response to the shape of the original recognized by said recognizing means; and
   calculating means for calculating a threshold for determining a level of density of a reproduced image on another main-scan line, in response to an output of said detecting means.

8. An image processing apparatus according to claim 7, wherein said calculating means calculates said threshold for each of said main-scan lines.

9. An image processing apparatus according to claim 7, wherein said detecting means detects the density levels for a plurality of the main-scan lines and said calculating means calculates the threshold in response to the density levels.

10. An image processing apparatus according to claim 7, further comprising a memory for storing the density level detected by said detecting means.

* * * * *

UNITED STATES PATENT AND TRADEMARK OFFICE
CERTIFICATE OF CORRECTION

PATENT NO. : 4,672,461  
DATED : June 9, 1987  
INVENTOR(S) : EIICHI YOSHIDA

It is certified that error appears in the above-identified patent and that said Letters Patent is hereby corrected as shown below:

COLUMN 2

Line 25,   "photo sensitive" should read --photosensitive--.

COLUMN 3

Line 4,    "surafce" should read --surface--.  
    Line 18,   "on" should be deleted.  
    Line 27,   "the black" should read --black--.  
    Line 29,   "when" should read --the--.  
    Line 29,   "the" should read --when--.

COLUMN 4

Line 67,   "circuit" should read --circuits--.

COLUMN 5

Line 34,   "due to" should read --on the basis of--.  
    Line 39,   "due to" should read --on the basis of--.  
    Line 65,   "$\hat{w}_1$" should read --$\hat{W}_1$--.

UNITED STATES PATENT AND TRADEMARK OFFICE

CERTIFICATE OF CORRECTION

PATENT NO. : 4,672,461

DATED : June 9, 1987

INVENTOR(S) : EIICHI YOSHIDA

It is certified that error appears in the above-identified patent and that said Letters Patent is hereby corrected as shown below:

COLUMN 6

Line 53, "begin" should read --the--.
Line 54, "the" should read --begin--.

Signed and Sealed this

Sixth Day of October, 1987

Attest:

DONALD J. QUIGG

Attesting Officer

Commissioner of Patents and Trademarks